(12) United States Patent
Hanks et al.

(10) Patent No.: US 9,160,169 B2
(45) Date of Patent: Oct. 13, 2015

(54) SCHEDULING TO MAXIMIZE UTILIZATION PREFERRED POWER SOURCES (SMUPPS)

(75) Inventors: Carl J. Hanks, Saint Louis, MO (US); James W. Fonda, Moscow Mills, MO (US)

(73) Assignee: The Boeing Company, Chicago, IL (US)

( * ) Notice: Subject to any disclaimer, the term of this patent is extended or adjusted under 35 U.S.C. 154(b) by 748 days.

(21) Appl. No.: 12/915,011

(22) Filed: Oct. 29, 2010

(65) Prior Publication Data

US 2012/0109392 A1   May 3, 2012

(51) Int. Cl.
*H02J 3/00* (2006.01)
*H02J 3/38* (2006.01)

(52) U.S. Cl.
CPC .................. *H02J 3/008* (2013.01); *H02J 3/381* (2013.01); *H02J 3/382* (2013.01); *H02J 3/383* (2013.01); *H02J 3/386* (2013.01); *Y02E 10/563* (2013.01); *Y02E 10/763* (2013.01); *Y04S 50/10* (2013.01)

(58) Field of Classification Search
CPC ........... H02J 3/008; H02J 3/381; H02J 3/382; H02J 3/383; H02J 3/386; Y02E 10/563; Y02E 10/763; Y04S 50/10
USPC .............................. 700/29, 30, 286, 291, 295
See application file for complete search history.

(56) References Cited

U.S. PATENT DOCUMENTS

| | | | |
|---|---|---|---|
| 2005/0034023 A1* | 2/2005 | Maturana et al. | 714/37 |
| 2005/0055137 A1* | 3/2005 | Andren et al. | 700/291 |
| 2005/0187727 A1 | 8/2005 | Weik et al. | |
| 2006/0276938 A1 | 12/2006 | Miller | |
| 2007/0203860 A1 | 8/2007 | Golden et al. | |
| 2007/0276547 A1 | 11/2007 | Miller | |
| 2009/0319090 A1* | 12/2009 | Dillon et al. | 700/291 |
| 2010/0264739 A1 | 10/2010 | Errington | |
| 2011/0029461 A1* | 2/2011 | Hardin, Jr. | 705/412 |
| 2011/0172838 A1* | 7/2011 | Pai et al. | 700/292 |

OTHER PUBLICATIONS

International Search Report and Written Opinion of the International Searching Authority mailed on Feb. 21, 2012 for PCT Application No. PCT/US 11/53115 filed on Sep. 23, 2011—International Searching Authority—European Patent Office.

* cited by examiner

*Primary Examiner* — Mohammad Ali
*Assistant Examiner* — Nathan L Laughlin
(74) *Attorney, Agent, or Firm* — McDonnell Boehnen Hulbert & Berghoff LLP

(57) ABSTRACT

A power utilization scheduling system and methods are disclosed. A prioritized energy consumption schedule is determined based on a prioritized energy consumption. A per-process energy consumption model is determined based on an energy consumption model, and an operation is scheduled based on the prioritized energy consumption schedule and the per-process energy consumption model.

20 Claims, 7 Drawing Sheets

SCHEDULING TO MAXIMIZE UTILIZATION PREFERRED POWER SOURCES (SMUPPS)

FIELD

Embodiments of the present disclosure relate generally to electric power utilization. More particularly, embodiments of the present disclosure relate to electric power utilization scheduling.

BACKGROUND

Electricity grids generally comprise a variety of energy sources that produce electric power according to various schedules. Efforts to inject market forces to better balance supply and demand have resulted in a move away from flat rate pricing to prices based on demand vs. supply cost and availability. For example, base load power is generally the lowest priced power and available 24/7; however, base load power stations generally also must operate and produce power on a 24/7 basis. As such, at night when demand may be lowest but base load power stations are still producing power, pricing may be substantially low. Furthermore, renewable sources of power such as wind turbines may produce power with great variability and may produce power during times of low demand such as late at night. By lower pricing during times of low demand, a utility company may encourage increased consumption to balance demand to supply.

SUMMARY

A system and methods for scheduling power utilization are disclosed. Energy needs are assessed based on scheduled energy usage, where the scheduled energy usage is based on historical and projected usage of preferred energy sources. Reliability and availability of available energy sources during times of the scheduled energy usage are determined, and the available energy sources may be ranked based on the reliability, availability, and a carbon footprint associated with each energy source. Thereby, energy cost is reduced and life expectancy of the device is increased. The preferred energy sources are selected from the available energy sources based on the reliability, availability, carbon footprint, and demand requirements associated with the scheduled energy usage. Furthermore, the scheduled energy usage may be optimized to increase usage of preferred power sources and minimize cost. The optimized energy usage schedule can be used by an operating device, causing the device to automatically operate at reduced power or more efficiently. In this manner, usage of the preferred energy sources is maximized, while ensuring a manufacturing process and or an operation is scheduled to produce a product on time and at a reduced energy cost.

A first embodiment comprises a method for power utilization scheduling. A prioritized energy consumption schedule is determined based on a prioritized energy consumption. A per-process energy consumption model is determined based on an energy consumption model, and an operation is scheduled based on the prioritized energy consumption schedule and the per-process energy consumption model.

In a second embodiment, a power utilization scheduling system comprises an energy consumption schedule prioritization module operable to determine a prioritized energy consumption schedule based on a prioritized energy consumption. The power utilization scheduling system further comprises a per-process energy consumption model module operable to determine a per-process energy consumption model based on an energy consumption model. The power utilization scheduling system further comprises an operation scheduling module operable to schedule an operation based on the prioritized energy consumption schedule and the per-process energy consumption model.

In a third embodiment, a computer readable storage medium comprises computer executable instructions for performing a method for power utilization scheduling. The method is executed by the compute-executable instructions and comprises determining a prioritized energy consumption schedule based on a prioritized energy consumption. The method executed by the compute-executable instructions further comprises determining a per-process energy consumption model based on an energy consumption model, and scheduling an operation based on the prioritized energy consumption schedule and the per-process energy consumption model.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
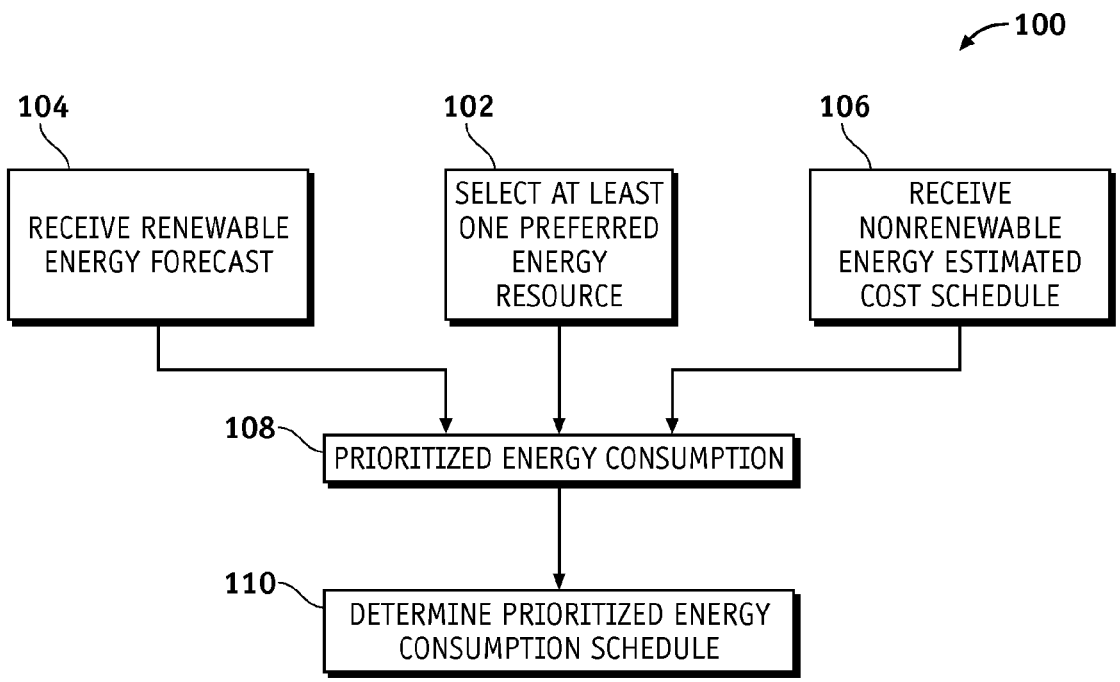
FIG. 1 is an illustration of an exemplary flowchart showing a prioritized energy consumption scheduling process according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to energy utilization, factory production, computation, mathematical formulation, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, power consumption for factory production. Embodiments of the disclosure, however, are not limited to such factory production, and the techniques described herein may also be utilized in other electricity usage applications and operations, and other types of product production. For example but without limitation, embodiments may be applicable to ship board power usage, house hold power usage, hospital power usage, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Scheduling to Maximize Utilization Preferred Power Sources (SMUPPS) optimizes a schedule of machine usage to maximize a usage of preferred energy resources while maintaining a preferred operational rate. Preferred energy sources may comprise, for example but without limitation, lower cost energy sources, renewable energy sources, or the like. A SMUPPS system according to an embodiment of the disclosure uses input from, for example but without limitation, renewable power forecasting, operation scheduling, energy estimated cost schedules, a per-process energy consumption model, historical power consumption data, and the like. Operation schedule, may comprise any operational power utilization schedule, such as but without limitation, factory production schedule, hospital power usage schedule, printing press power usage schedule, and the like. Using these inputs, the SMUPPS system derives an operation schedule such as a production schedule that meets a target production rate while maximizing the usage of preferred energy sources. The SMUPPS system ensures that usage of the preferred energy sources is maximized, while continuing to ensure that part manufacturing is scheduled to be produced on time as explained in more detail below.

Figure 2:
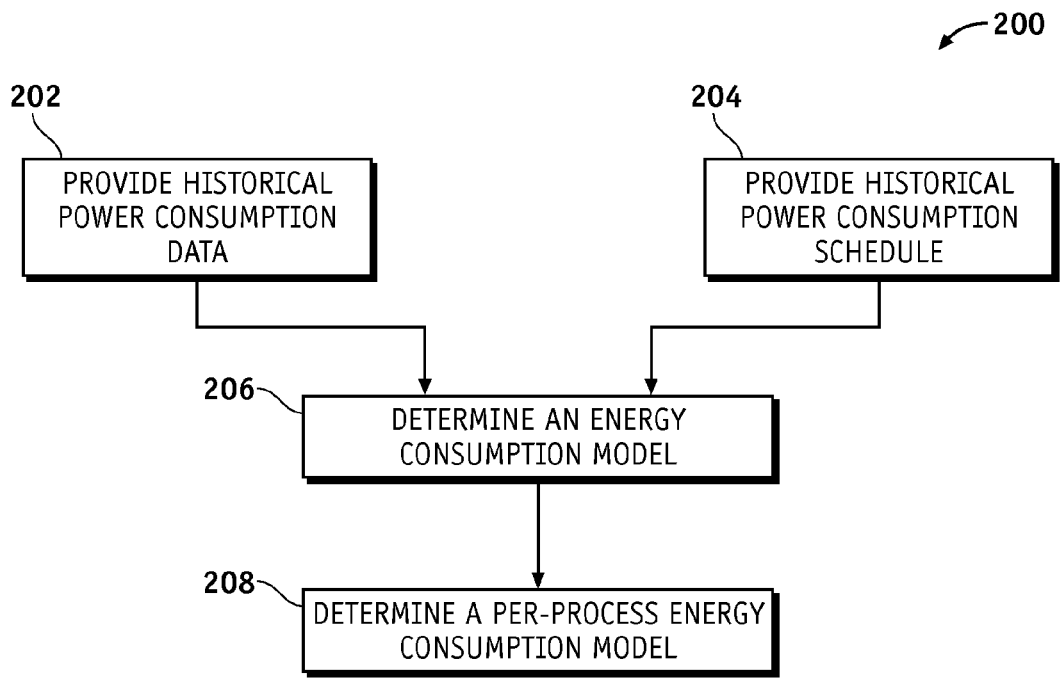
FIG. 2 is an illustration of an exemplary flowchart showing a per-process energy consumption modeling process based on an availability of power according to an embodiment of the disclosure
Figure 3:
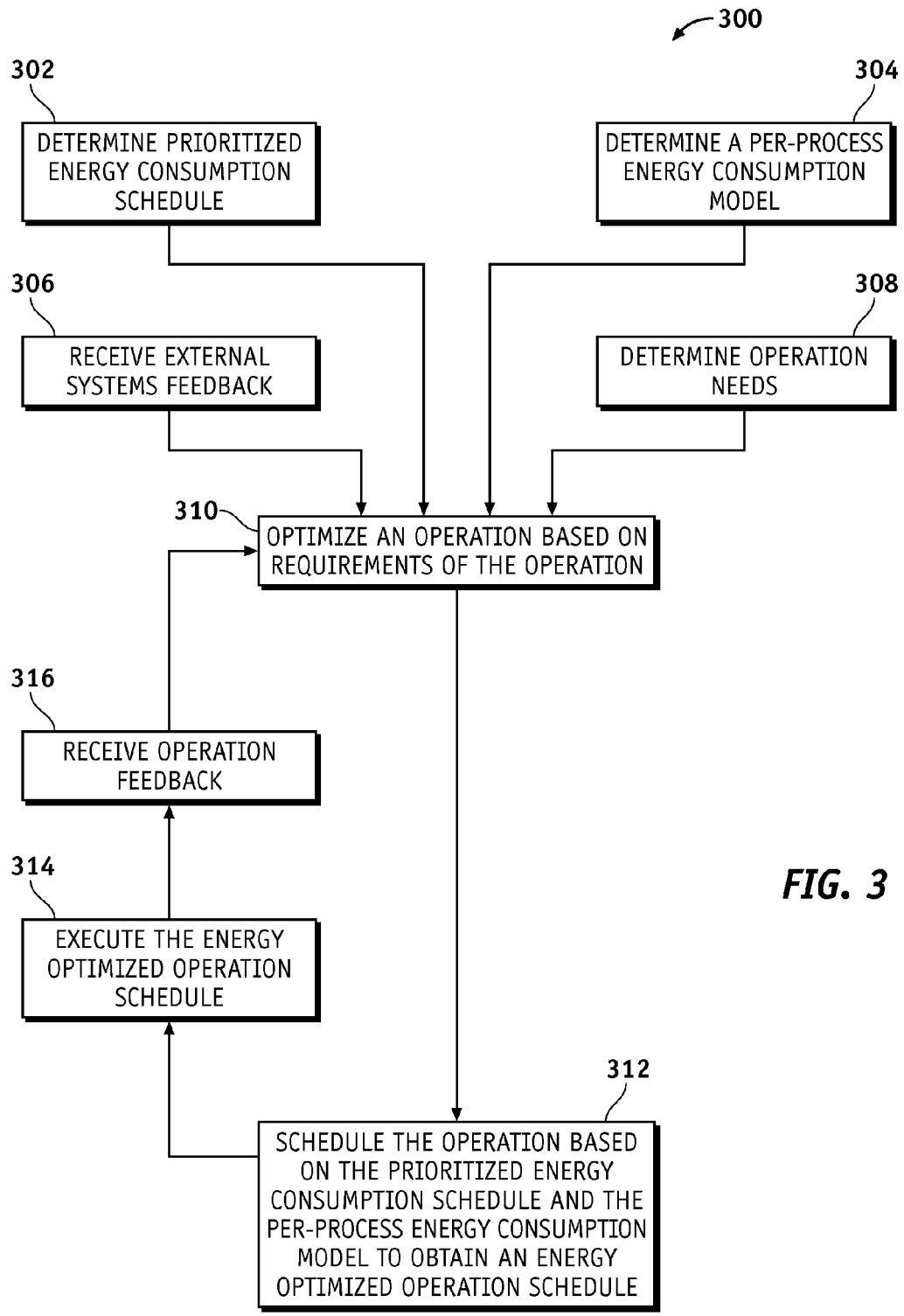
FIG. 3 is an illustration of an exemplary flowchart showing a power utilization scheduling process according to an embodiment of the disclosure.

FIGS. 1-3 are illustrations of exemplary flowcharts showing processes 100-300 according to embodiments of the disclosure. The various tasks performed in connection with processes 100-300 may be performed by software, hardware, firmware, a computer-readable medium having computer executable instructions for performing the processes methods, or any combination thereof. The processes 100-300 may be recorded in a computer-readable medium such as a semiconductor memory, a magnetic disk, an optical disk, and the like, and can be accessed and executed, for example, by a computer CPU such as the processor module 408 (FIG. 4) in which the computer-readable medium is stored. It should be appreciated that processes 100-300 may include any number of additional or alternative tasks, the tasks shown in FIGS. 1-3 need not be performed in the illustrated order, and processes 100-300 may be incorporated into more comprehensive procedures or processes each having additional functionality not described in detail herein. For illustrative purposes, the following description of processes 100-300 may refer to elements mentioned below in connection with FIG. 4. In practical embodiments, portions of the processes 100-300 may be performed by different elements of the system 400 such as: an energy consumption schedule prioritization module 402, a per-process energy consumption model module 404, an operation scheduling module 406, a processor module 408, a memory module 410, a display module 412, and a feedback module 414 as explained below in the context of discussion of FIG. 4.

FIG. 1 is an illustration of an exemplary flowchart showing a prioritized energy consumption scheduling process 100 based on an availability of electric power according to an embodiment of the disclosure. The prioritized energy consumption scheduling process 100 (process 100) is describe in conjunction with FIGS. 5-9. The availability of electric power depends on an availability of electric power from a power source. Power sources such as power stations may be grouped by their availability, such as but without limitation, base load, load following, peaking, intermittent, and the like.

Figure 5:
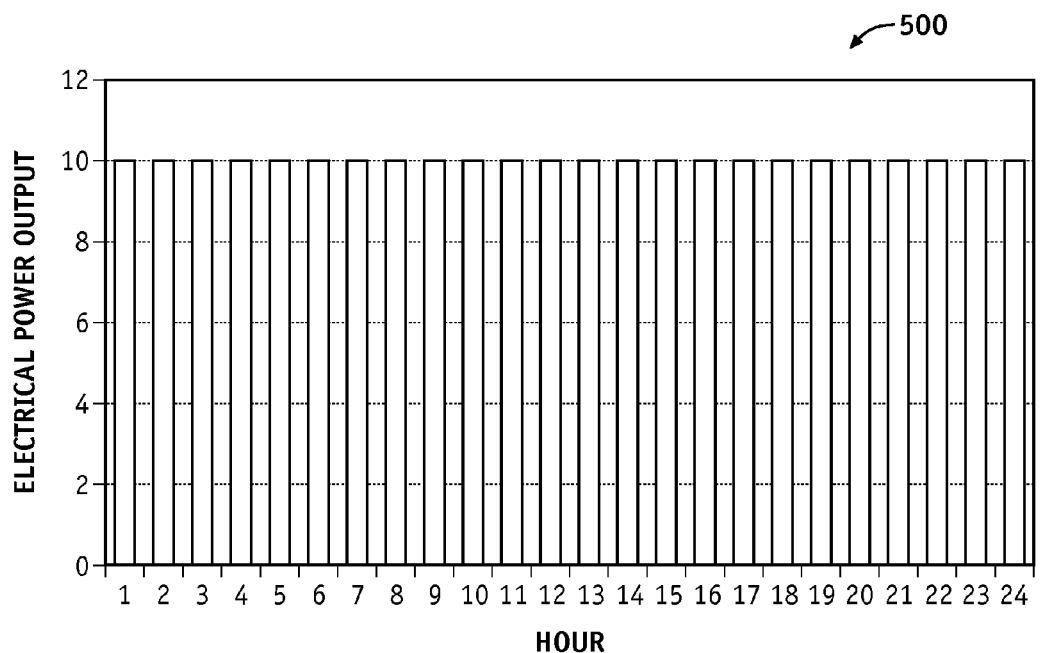
FIG. 5 is an illustration of an exemplary electrical output on an hourly basis for a base load power station.

Base load power plants generally produce power 24 hours a day and 365 days a year excluding maintenance. FIG. 5 shows an exemplary electrical output on an hourly basis for a base load power station. The base load power plants also generally operate substantially more efficiently if operated without substantially varying power output.

Figure 6:
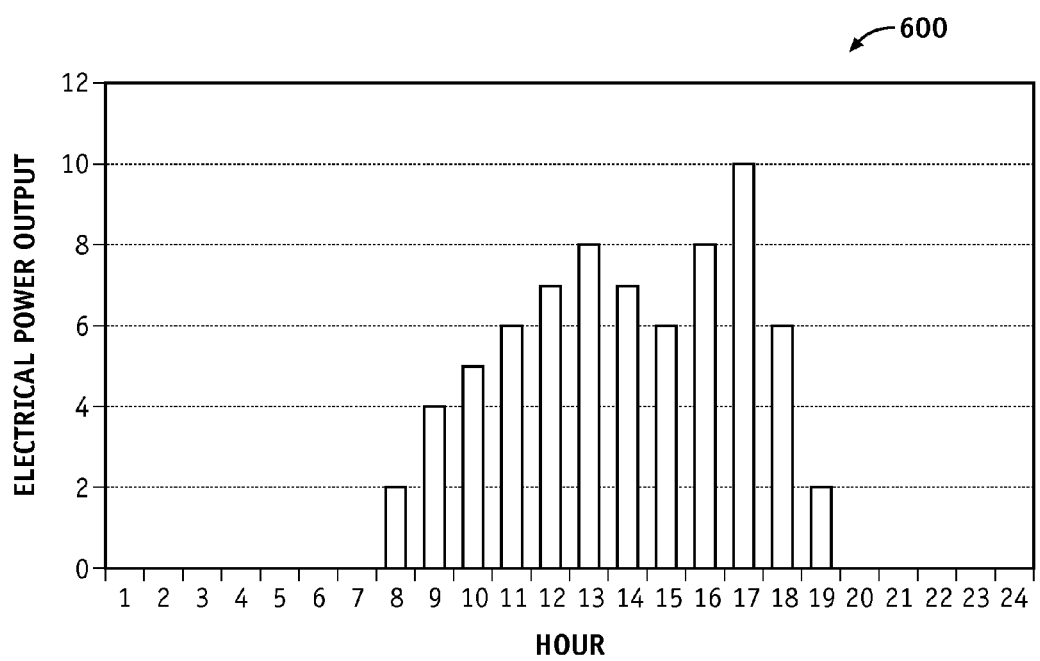
FIG. 6 is an illustration of an exemplary electrical output on an hourly basis for a load following power station.

A load following power plant is a power plant that adjusts its power output as demand for electricity fluctuates throughout the day. FIG. 6 shows an exemplary electrical output on an hourly basis for a load following power station. Load following plants are typically in-between base load and peaking power plants in efficiency, speed of startup and shutdown, construction cost, cost of electricity and capacity factor.

Figure 7:
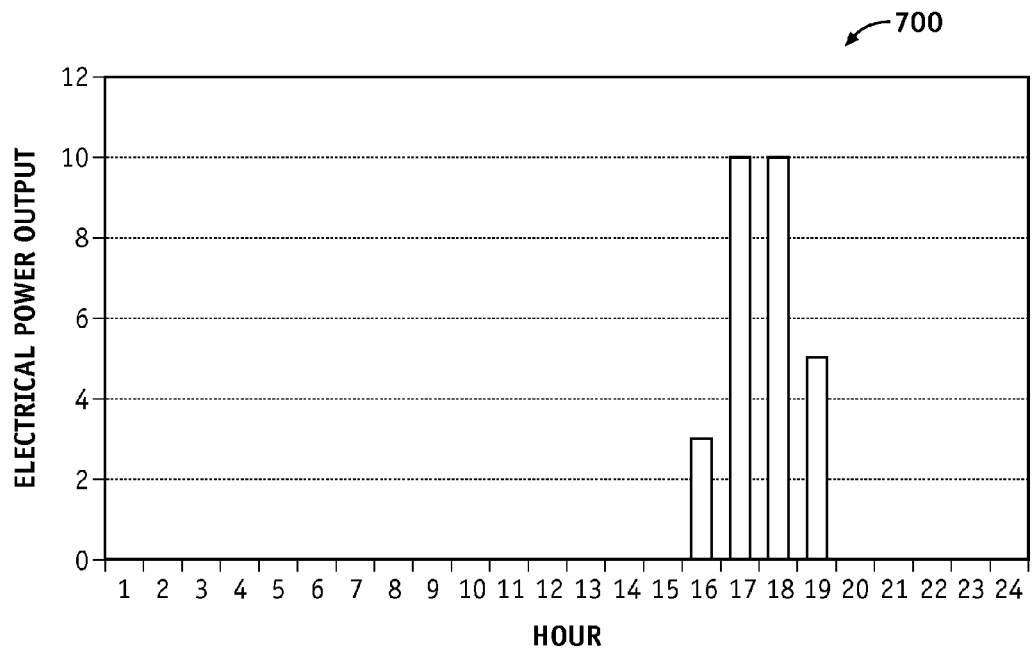
FIG. 7 is an illustration of an exemplary electrical output on an hourly basis for a peaking power station.

Peaking power plants are power plants that generally run only when there is a high demand, known as peak demand, for electricity. In the United States, peak demand often occurs in an afternoon, particularly during summer months when an air conditioning load may be high. FIG. 7 shows an exemplary electrical output on an hourly basis for a peaking power station. A peak power load on an electrical grid generally occurs during evening such as 5:00 p.m. (17:00) and 6:00 p.m. (18:00) when people return home from work, turn-on an electrical stove for cooking dinner, turn up an air conditioner, and the like. Concurrent with people returning home, many workplaces may still be open and consuming power. A time that a peaking power plant operates may be many hours a day or as little as a few hours per year. Building an efficient power plant can be expensive, so a peaking power plant runs for a short or variable time may be built at a lower cost but less efficient than a base load power plant. In addition, equipment used in base load power plants may be unsuitable for use in peaking power plants because variable operation of the peaking power plants may strain the equipment if used in a peaking power plant. Also, fuel used in base load power plants such as un-gasified coal may be unsuitable for use in peaking power plants such as peaking power plants using gas turbines. Because nuclear, geothermal, waste-to-energy, coal, and biomass systems are generally not suitable for variable operations, they are generally not operated as peaking power plants. Peaking power plants are generally hydroelectric or gas turbines that burn natural gas. Many peaking power plants can also use petroleum-derived liquids, diesel oil and jet fuel as a backup fuel. The thermodynamic efficiency of simple-cycle gas turbine power plants can generally range from about 20% to about 45% depending on technology used. Current gas turbine power plants with an additional bottoming cycle can generally operate with an efficiency between about 55% to about 65%.

Intermittent power stations are generally sources of renewable energy such as wind and solar. Dispatch-ability is an ability to match a generated electricity supply to an electricity demand. Many renewable energy sources such as wind and solar may be uncontrollably variable or intermittent, and thus less dispatch-able than conventional power sources. Intermittent power stations must generally be compensated for by peaking or load following power stations or power cuts when they are not producing power. Intermittent power stations may also cause grid overloading that must generally be compensated for by cutting base load power.

Process 100 may begin by selecting at least one preferred energy resource (task 102) from the power sources explained above and renewable energy sources explained below. The preferred energy resource may be specified by, for example but without limitation, cost, generation media (solar, wind, coal, nuclear, etc.), geographic location, and the like. For example, preferring renewable energy sources could ensure that a carbon footprint of manufactured goods is optimized; however, when trying to optimize production rate, a use of less-preferred sources may expand in order to meet a desired operational schedule. The preferred energy resource may also be selected based on demand requirements associated with an energy consumption model as explained below.

Process 100 may continue by receiving a renewable energy forecast (task 104). Renewable energy is generally considered to be energy that comes from sources that are naturally replenished, such as but without limitation, plants, sunlight, wind, rain, tides, water, geothermal heat, and the like. Sources of renewable electrical energy may comprise, for example but without limitation, biomass thermal power stations, hydroelectric power stations, wind turbines, photovoltaic panels, solar thermal power stations, geothermal power stations, and the like.

Figure 8:
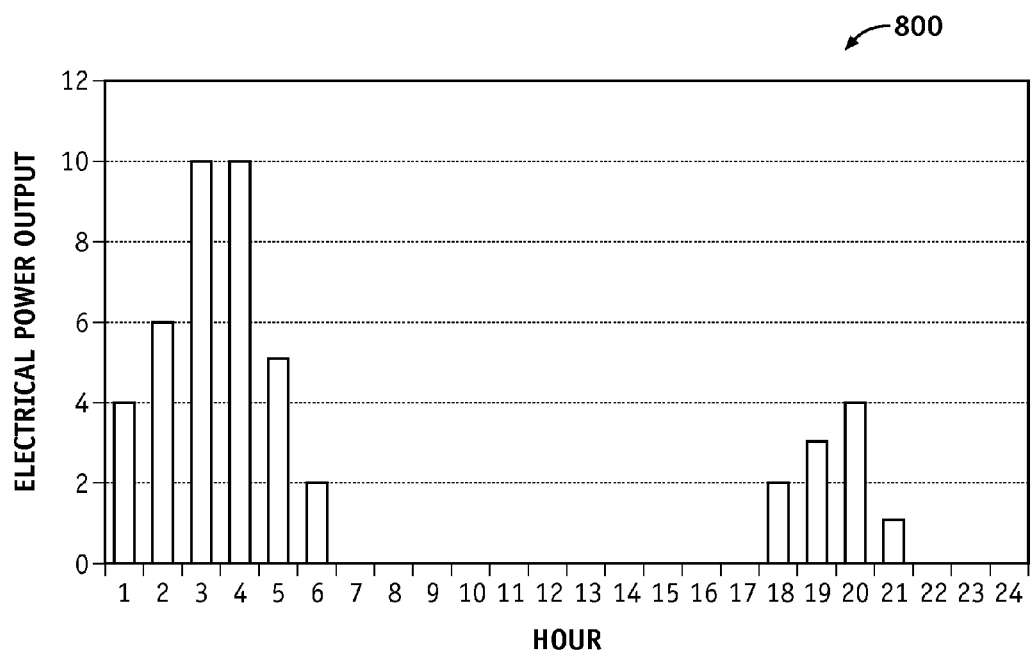
FIG. 8 is an illustration of an exemplary electrical output on an hourly basis for a wind turbine power station.
Figure 9:
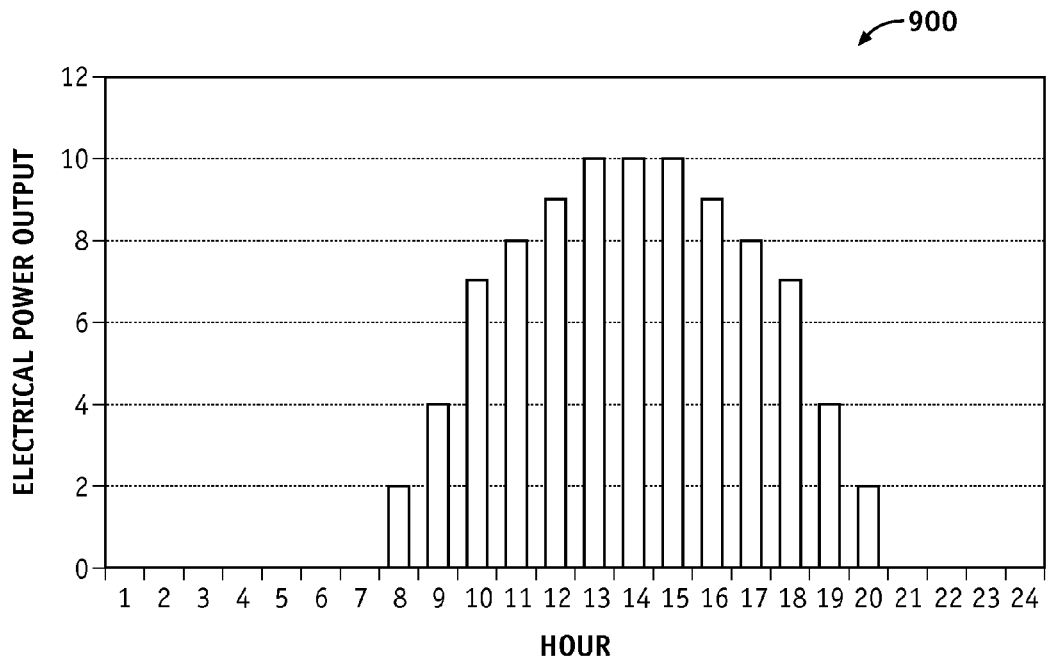
FIG. 9 is an illustration of an exemplary electrical output on an hourly basis for a solar power station.

As mentioned above, generally, renewable energy sources are intermittent. For example, wind is available when wind blows, which is generally about 20% to about 30% of a period of time in many land locations in the U.S. Offshore wind power turbines may have about 40% availability. In many areas, wind is produced substantially at night when power demand may be lowest. FIG. 8 shows an exemplary electrical output on an hourly basis for a wind turbine power station. Solar has an advantage over wind in that it is generally available when demand for electricity is substantially high (e.g., during daylight hours when air conditioning causes high demand). FIG. 9 shows an exemplary electrical output on an hourly basis for a solar power station. Unlike most renewable sources, biomass thermal power stations can generally be operated as a base load or load following power station. Biomass thermal power stations can generally function substantially in a same manner as a coal fired power station using wood or compressed biomass as a replacement for coal. Geothermal power is generally operated as a base load power station, since geothermal power is available continuously and system costs are generally not conducive to excess capacity needed for load following.

An availability of substantially many renewable energy sources may be predicted with substantially high accuracy for substantially short time frames (e.g., hours or days). For example, both solar and wind power are substantially weather dependent, but modern weather forecasting can have substantially high accuracy over hours or days in many areas of the world. Thus, a substantially accurate renewable energy forecast may be determined.

Process 100 may continue by receiving a nonrenewable energy estimate cost schedule (task 106). Nuclear power stations are generally operated as base load power stations and over an extended life produce power at a substantially low cost (e.g., 2 to 5 times lower than renewable power). Coal power stations are generally operated as base load or load following power stations and produce power at a price substantially similar to nuclear. Natural gas power stations can be operated as base load, load following, and peaking power stations depending on configuration. Natural gas power stations produce power at a price that is substantially dependent on a natural gas price, and may be substantially low cost or substantially high cost depending on the natural gas price. A nonrenewable energy estimate cost schedule can be readily determined from, for example but without limitation, electrical utilities, grid operators, electric power exchanges, futures markets, and the like.

Process 100 may then continue by automatically determining a prioritized energy consumption based on the renewable energy forecast, the nonrenewable energy estimate cost schedule, and at least one preferred energy source to determine a prioritized energy consumption (task 108). Electrical energy consumption may be prioritized based on, for example but without limitation, price, carbon footprint, availability, and the like.

Process 100 may then continue by determining a prioritized energy consumption schedule based on the prioritized energy consumption (task 110). In this manner, the process 100 uses the energy consumption schedule prioritization module 402 (FIG. 4) to, for example, schedule for producing a first manufacturing part at a first scheduled time utilizing a first energy source, and a second manufacturing part at a second scheduled time utilizing a second energy source, and so on, such that the power consumption and the associated cost is minimized.

FIG. 2 is an illustration of an exemplary flowchart showing a per-process energy consumption modeling process 200 according to an embodiment of the disclosure. The per-process energy consumption modeling process 200 (process 200) is described in conjunction with FIG. 10.

Figure 10:
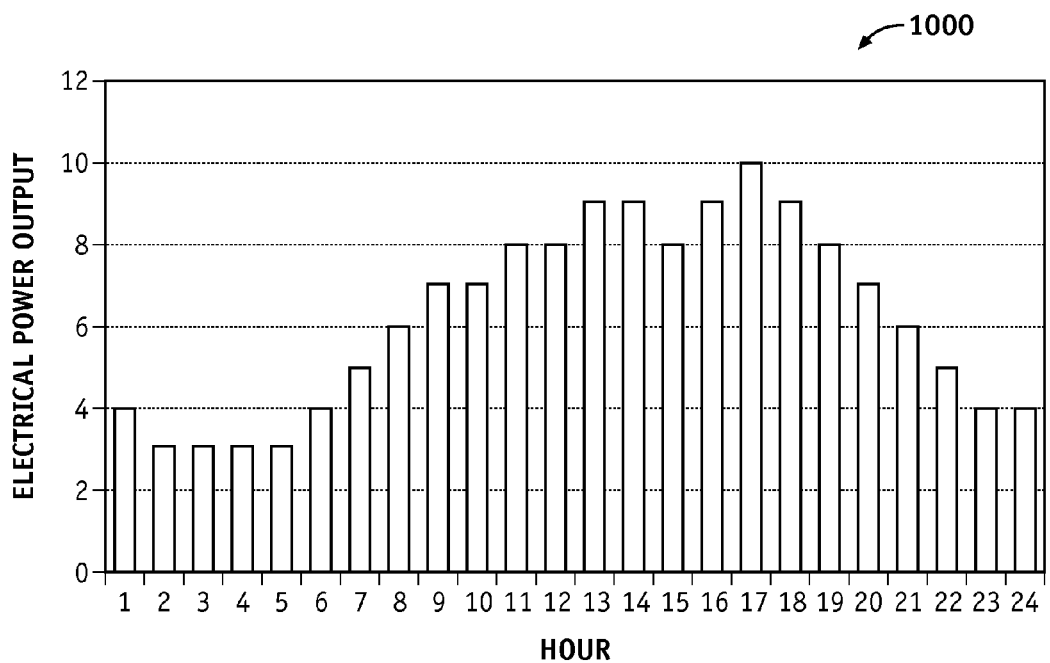
FIG. 10 is an illustration of an exemplary historical power consumption data on an hourly basis.

Process 200 may begin by providing historical power consumption data (task 202). The historical power consumption data may comprise, for example but without limitation, kilowatts of power used to produce a certain manufacturing part at a certain time of the day for a certain cost in the past. FIG. 10 is an illustration of exemplary historical power consumption data on an hourly basis. A price of electrical power during peak demand such as between 1:00 p.m. (13:00) and 7:00 p.m. (19:00) may be substantially higher than a price during low demand such as between 11:00 p.m. (23:00) and 7:00 a.m. (07:00).

The process 200 may continue by providing an historical production schedule (task 204). The historical production schedule may comprise, for example but without limitation, a certain number of manufacturing parts scheduled for production by a certain time of a certain day.

The process 200 may continue by automatically determining an energy consumption model based on the historical power consumption data and the historical production schedule (task 206) using the per-process energy consumption model module 404.

The process 200 may continue by determining per-process energy consumption (task 208). For example, the process 200 uses the per-process energy consumption model module 404 to determine which process should be given priority based on an available energy and an associated cost. By correlating historic power consumption data and historic production schedules, process 200 derives a Process Energy Consumption Model (PECM) for each manufacturing process in a manufacturing product line. The PECM comprises a complete profile of all power consumed during the manufacturing process, or sub-process. The profile comprises a partial-ordered list of steps involved in the process comprising dependencies of which steps must occur before others. Each manufactured step has associated power consumption. The PECM may also comprise alternative processes that may be used to meet an end production goal.

FIG. 3 is an illustration of an exemplary flowchart showing a power utilization scheduling process 300 (process 300) according to an embodiment of the disclosure. The process 300 may have functions, material, and structures that are similar to the embodiments shown in the processes 100-200. Therefore common features, functions, and elements may not be redundantly described here. The process 300 is describe in conjunction with FIGS. 11 and 12. The process 300 is described herein in the context of a practical non-limiting application, namely, power consumption for factory production. Process 300, however, is not limited to such factory production, and the techniques described herein may also be utilized in other electricity usage applications and operations, and other types of product production as explained above.

Figure 11:
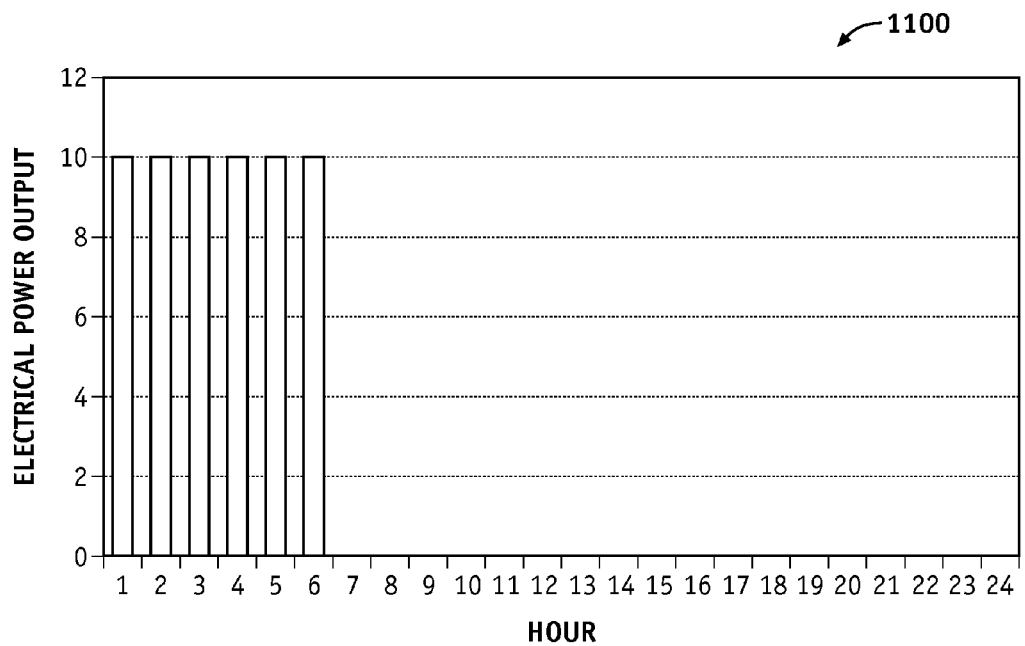
FIG. 11 is an illustration of an exemplary prioritized energy consumption schedule on an hourly basis.

The process 300 may begin by the energy consumption schedule prioritization module 402 determining a prioritized energy consumption schedule (task 302). The determination of the prioritized energy consumption schedule is described above in the context of discussion of the process 100 above. FIG. 11 is an illustration of an exemplary prioritized energy consumption schedule on an hourly basis. As shown in FIG. 11, energy consumption is scheduled between 1:00 a.m. (01:00) and 7:00 a.m. (07:00), thus illustrating a schedule for lowest cost energy consumption. Updates to energy forecasts may also cause the prioritized energy consumption schedule to be refined. Smart Grid technologies may allow for more frequent updates on information about energy prices and/or energy sources. These factors may result in the factory schedule being updated, either to take advantage of lower than expected energy prices or to shift work to a time where the expected renewable energy production may be higher.

The process 300 may continue by the per-process energy consumption model module 404 determining a per-process energy consumption model based on an energy consumption model (task 304) as discussed above in the context of discussion of the process 200.

The process 300 may continue by the operation scheduling module 406 receiving external systems feedback (task 306). The external system feedback may comprise, for example but without limitation, an unavailability of manpower at scheduled times, factory utilization, and the like.

The process 300 may then continue by the operation scheduling module 406 determining operation/production needs (task 308). For example, process 300 may determine when production equipment and man power are available for a project. The production needs of the factory may be provided by an external enterprise resource planning system. The production needs may comprise a list of all of the parts which need to be manufactured along with a deadline for a production of each part.

The process 300 may then continue by optimizing an operation based on requirements of the operation (task 310). A result of optimizing the operation may comprise, for example but without limitation, a scheduled factory production, and the like. The requirements of the operation may comprise, for example but without limitation, the external systems feedback, the operation/production needs, and the like.

Figure 12:
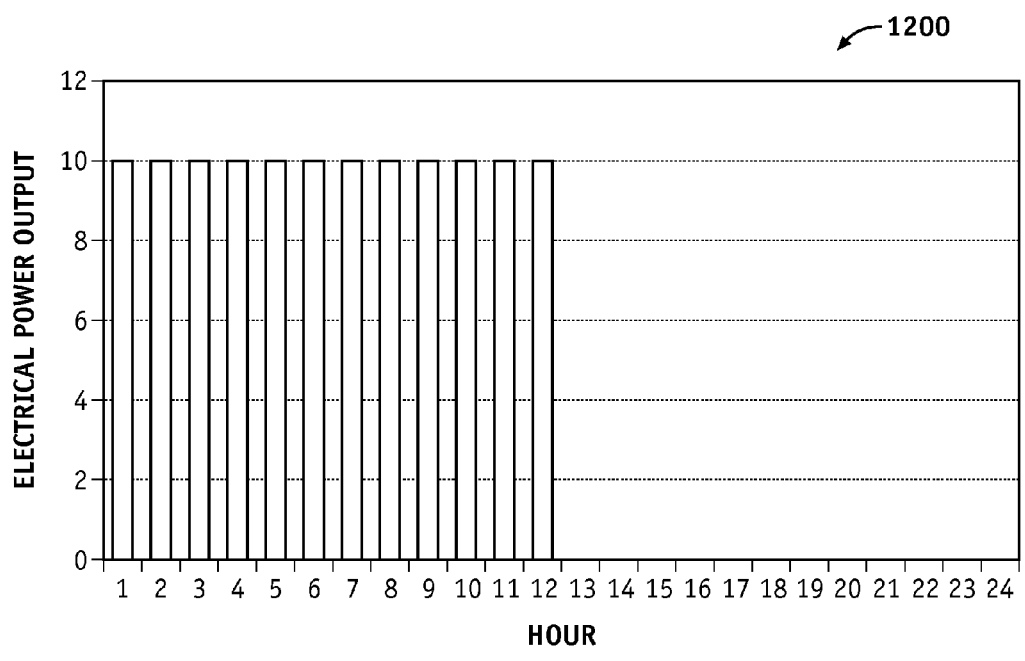
FIG. 12 is an illustration of an exemplary electrical demand on an hourly basis for an operation schedule.

The process 300 may then continue by the operation scheduling module 406 (FIG. 4) scheduling the operation based on the prioritized energy consumption schedule and the per-process energy consumption model to obtain an energy optimized operation schedule (task 312). In this manner, the process 300 uses the operation scheduling module 406 (FIG. 4) to schedule the factory production based on the prioritized energy consumption schedule and the per-process energy consumption model to determine an energy optimized production schedule for the factory. The energy optimized factory schedule can be based on the process energy consumption model, the prioritized energy consumption schedule, and production needs. Each individual manufacturing part that needs to be produced is paired with its associated energy consumption model. By pairing each part with its associated energy consumption model, an overall energy and time needed for production with a partial ordering of production based on manufacturing part deadlines can be determined. After determining the partial ordering of production, the individual manufacturing parts are paired with the prioritized energy consumption schedule. The manufacturing parts needed and their energy needs are paired with timeslots in the prioritized energy consumption schedule. Through a continual refinement process a production schedule for the factory is created which ensures that substantially all parts are produced on time, while trying to ensure that the power consumed during production is as close as possible to the prioritized energy consumption schedule. FIG. 12 is an illustration of an exemplary electrical demand on an hourly basis for the factory schedule. As shown in FIG. 12, energy consumption is scheduled between 1:00 a.m. (01:00) and 1:00 p.m. (13:00), thus illustrating a schedule that takes into account factory utilization and manpower as well as energy cost and renewable energy availability.

The process 300 may continue by the operation scheduling module 406 executing the energy optimized operation schedule (task 314). The energy optimized operation schedule (operation schedule/factory schedule) may comprise, for example but without limitation, production time, number of pieces to produce, and the like.

The process 300 may continue by the operation scheduling module 406 receiving an operation/production feedback based on the energy optimized operation schedule (operation schedule/factory schedule) (task 316). The production feedback may comprise, for example but without limitation, product quality resulting from the manufacturing schedule. While the factory is executing the schedule, factors such as machine maintenance, supply chain problems, or other issues may cause the schedule not to be executed to plan. For example, a supplier management system may provide notification that a part will be delivered later than scheduled. Unplanned schedule changes can be fed back into the optimization stage so that the factory schedule can continually be refined.

Figure 4:
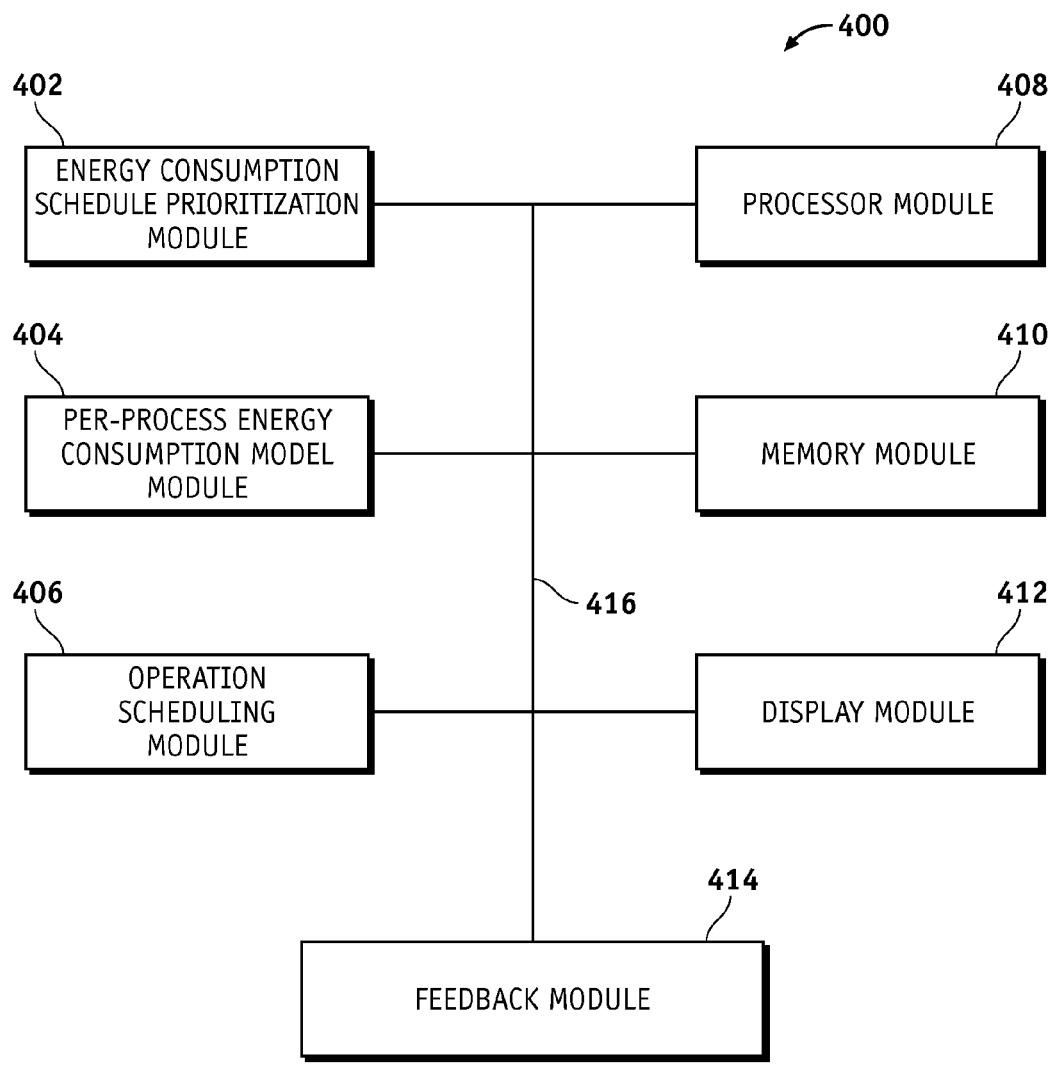
FIG. 4 is an illustration of an exemplary functional block diagram of a power utilization scheduling system according to an embodiment of the disclosure.

FIG. 4 is an illustration of an exemplary functional block diagram of a power utilization scheduling system 400 (system 400) according to an embodiment of the disclosure. The system 400 may represent, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment.

A practical system 400 may comprise any number of processor modules, any number of memory modules, and any number of display modules. The illustrated system 400 depicts a simple embodiment for ease of description. These and other elements of the system 400 are interconnected together via a communication link 416 allowing communication between the various elements of system 400. Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure. System 400 may have functions, material, and structures that are similar to the embodiments shown in the processes 100-300. Therefore common features, functions, and elements may not be redundantly described here.

The power utilization scheduling system 400 comprises an energy consumption schedule prioritization module 402, a per-process energy consumption model module 404, an operation scheduling module 406, a feedback module 414, a processor module 408, a memory module 410, and a display module 412.

The energy consumption schedule prioritization module 402 determines the prioritized energy consumption schedule based on the prioritized energy consumption. The energy consumption schedule prioritization module 402 receives the at least one preferred energy source selection, the renewable energy forecast, and the nonrenewable energy estimate cost schedule, and determines the prioritized energy consumption as described above in the context of discussion of process 100.

The per-process energy consumption model module 404 determines the per-process energy consumption model based on the energy consumption model. The per-process energy consumption model module 404 provides the historical power consumption data, the historical production schedule, and determines the energy consumption model based on the historical power consumption data and the historical production schedule as explained above.

The operation scheduling module 406 schedules the factory operation/production based on the prioritized energy consumption schedule and the per-process energy consumption model. The operation scheduling module 406 also determines production/operation needs, executes the factory schedule, and receives the production feedback based on the factory schedule.

The feedback module 414 provides a production feedback based on the factory schedule.

The processor module 408 is configured to support functions of the system 400. For example, the processor module 408 may control operations of the system 400 so that processes of the system 400 are suitably performed. These processes may comprise, for example but without limitation, controlling operation of the operation scheduling module 406 to schedule an energy optimized operation schedule (energy optimized factory production schedule) based on the prioritized energy consumption, the per-process energy consumption, operation/production needs, an operation schedule, systems feedback, and the like, as explained above. In this manner, processor module 408 causes system 400 to maximize usage of the preferred energy sources, while continuing to ensure that operations such as a part manufacturing is scheduled to be produced on time and at an optimized energy cost as explained above. Furthermore, the processor module 408 may automatically output the energy optimized operation schedule to an input of an operating device causing the device to operate at reduced power or more efficiently. Thereby, energy cost is reduced and life expectancy of the device is increased. The devices may comprise, for example but without limitation, manufacturing robots, printing devices, computers, assembly line robots, production devices, and the like.

The processor module 408 also controls the display module 412 to display input/output parameters such as the energy optimized factory schedule, and the like. Further, the processor module 408 accesses the memory module 410 to access the renewable energy forecast, nonrenewable energy estimated cost schedule, and the like. The processor module 408 provides the preferred energy source selection, the renewable energy forecast, and nonrenewable energy estimated cost schedule, for example, to the energy consumption schedule prioritization module 402 to determine a pritorized energy consumption such that energy and the cost associated with an operation such as a factory production is reduced. The processor module 408, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 408 comprises processing logic that is configured to carry out the functions, techniques, and processing tasks associated with the operation of system 400. In particular, the processing logic is configured to support e.g., power utilization scheduling described herein.

The memory module 410 may be any suitable data storage area with suitable amount of memory that is formatted to support the operation of the system 400. The memory module 410 is configured to store, maintain, and provide data as needed to support the functionality of the system 400 in the manner described below. In practical embodiments, the memory module 410 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 410 may be coupled to the processor module 408 and configured to store, for example but without limitation, data related to the renewable energy forecast, data related to nonrenewable energy estimated cost schedule, production needs, historical power consumption data, and the like.

The memory module 410 may also store, a computer program that is executed by the processor module 408, an operating system, an application program, tentative data used in executing a program processing, and the like. The memory module 410 may be coupled to the processor module 408 such that the processor module 408 can read information from and write information to memory module 410. As an example, the processor module 408 and memory module 410 may reside in their respective ASICs. The memory module 410 may also be integrated into the processor module 408. In an embodiment, the memory module 410 may comprise a cache memory for storing temporary variables or other intermediate information during execution of instructions to be executed by the processor module 408.

The display module 412 is configured to display input and output parameters of the system 400. The display module 412 displays results of the processes 100-300. The display module 412 may accept a user input operation to input and transmit data, and input operation commands for functions provided in the system 400. The display module 412 accepts the operation command, and outputs operation command information to the processor module 408 in response to the accepted operation command. The display module 412 may be formed by, for example but without limitation, an organic electro-luminescence (OEL) panel, liquid crystal panel (LCD), and the like. Various kinds of information can be displayed on the display module 412 via an image/video signal supplied from the processor module 408.

In this way, usage of the preferred energy sources is maximized, while ensuring a manufacturing process is scheduled on time and at a reduced energy cost.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 408 to cause the processor module 408 to perform specified operations. Such instructions, generally referred to as "computer program code" or "program code" (which may be grouped in the form of computer programs or other groupings), when executed, enable power utilization scheduling methods of the system 400.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 4 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for power utilization scheduling, the method comprising:
   determining a prioritized energy consumption schedule to utilize supplied energy supplied by at least one producer to maximize usage of a preferred energy source based on a prioritized energy consumption;
   determining a per-process energy consumption model based on an energy consumption model for each part in a list of parts for manufacturing;
   for each part in the list, prioritizing a manufacturing process using the per-process energy consumption model based on an available energy and an associated cost; and
   scheduling each manufacturing process in a timeslot of the prioritized energy consumption schedule paired to a factory production schedule to maintain a required production rate for scheduled factory production based on the prioritized energy consumption schedule, the per-process energy consumption model, and a manufacturing part deadline.

2. The method according to claim 1, further comprising determining the prioritized energy consumption by:
   selecting at least one preferred energy source;
   receiving a renewable energy forecast;
   receiving a nonrenewable energy estimate cost schedule; and
   determining the prioritized energy consumption based on the at least one preferred energy source, the renewable energy forecast, and the nonrenewable energy estimate cost schedule.

3. The method according to claim 2, further comprising selecting the at least one preferred energy source based on demand requirements associated with the energy consumption model.

4. The method according to claim 1, further comprising determining the energy consumption model by:
   providing historical power consumption data;
   providing an historical production schedule; and determining the energy consumption model based on the historical power consumption data and the historical production schedule by correlating historic power consumption data and historic production schedules, and deriving a Process Energy Consumption Model (PECM) for each manufacturing process in a manufacturing product line.

5. The method according to claim 1, further comprising:
executing a manufacturing process schedule based on the prioritized energy consumption schedule, the manufacturing process schedule comprising unplanned schedule changes so that a factory schedule can continually be refined; and
receiving a feedback based on the manufacturing process schedule.

6. The method according to claim 1, further comprising receiving external systems feedback comprising: unavailability of manpower at scheduled times, factory utilization, or a combination thereof.

7. The method according to claim 1, further comprising determining manufacturing process needs.

8. The method according to claim 1, wherein the at least one producer is one or more utility company.

9. The method according to claim 2, wherein
the at least one preferred energy source is one or more of a biomass energy source and a geothermal energy source.

10. The method according to claim 1, wherein the supplied energy is used independent of communication to the at least one producer.

11. A power utilization scheduling system comprising:
an energy consumption schedule prioritization module operable to determine a prioritized energy consumption schedule to utilize supplied energy supplied by at least one producer to maximize usage of a preferred source based on a prioritized energy consumption;
a per-process energy consumption model module operable to determine a per-process energy consumption model based on an energy consumption model for each part in a list of parts for manufacturing; and
an operation scheduling module operable to:
for each part in the list, prioritize a manufacturing process using the per-process energy consumption model based on an available energy and an associated cost; and
schedule each manufacturing process in a timeslot of the prioritized energy consumption schedule paired to a factory production schedule to maintain a required production rate for scheduled factory production based on the prioritized energy consumption schedule, the per-process energy consumption model, and a manufacturing part deadline.

12. The system according to claim 11, wherein the energy consumption schedule prioritization module is further operable to:
receive at least one preferred energy source selection;
receive a renewable energy forecast;
receive a nonrenewable energy estimate cost schedule; and
prioritize energy consumption based on the at least one preferred energy source selection, the renewable energy forecast, and the nonrenewable energy estimate cost schedule to determine the prioritized energy consumption.

13. The system according to claim 11, wherein the per-process energy consumption model module is further operable to:
provide historical power consumption data;
provide an historical production schedule; and
determine the energy consumption model based on the historical power consumption data and the historical production schedule by correlating historic power consumption data and historic production schedules, and deriving a Process Energy Consumption Model (PECM) for each manufacturing process in a manufacturing product line.

14. The system according to claim 11, wherein the operation scheduling module is further operable to:
execute a manufacturing process schedule based on the prioritized energy consumption schedule, the manufacturing process schedule comprising unplanned schedule changes so that a factory schedule can continually be refined; and
receive an operation feedback based on the manufacturing process schedule.

15. The system according to claim 11, wherein the operation scheduling module is further operable to receive external systems feedback comprising:
unavailability of manpower at scheduled times, factory utilization, or a combination thereof.

16. The system according to claim 11, wherein the operation scheduling module is further operable to determine a manufacturing process need.

17. The system according to claim 11, wherein the supplied energy is used independent of communication to the at least one producer.

18. A non-transitory computer readable storage medium comprising computer-executable executable instructions for performing a method for power utilization scheduling, the method executed by the compute-executable instructions comprising:
determining a prioritized energy consumption schedule to utilize supplied energy supplied by at least one producer to maximize usage of a desired source based on a prioritized energy consumption;
determining a per-process energy consumption model based on an energy consumption model for each part in a list of parts for manufacturing;
for each part in the list, prioritizing a manufacturing process using the per-process energy consumption model based on an available energy and an associated cost; and
scheduling each manufacturing process in a timeslot of the prioritized energy consumption schedule paired to a factory production schedule to maintain a required production rate for scheduled factory production based on the prioritized energy consumption schedule, the per-process energy consumption model, and a manufacturing part deadline.

19. The non-transitory computer readable storage medium according to claim 18, further comprising computer-executable instructions for determining the prioritized energy consumption, the computer-executable instructions for:
receiving at least one preferred energy source selection;
receiving a renewable energy forecast;
receiving a nonrenewable energy estimate cost schedule; and
automatically prioritizing energy consumption based on the at least one preferred energy source selection, the renewable energy forecast and the nonrenewable energy estimate cost schedule to determine the prioritized energy consumption.

20. The non-transitory computer readable storage medium according to claim 18, wherein the supplied energy is used independent of communication to the at least one producer.

* * * * *